US008098259B2

(12) United States Patent
Kondo et al.

(10) Patent No.: US 8,098,259 B2
(45) Date of Patent: Jan. 17, 2012

(54) IMAGE DISPLAY DEVICE

(75) Inventors: Yoshitake Kondo, Kanagawa (JP);
Hideki Onuma, Tokyo (JP); Koji Hirai,
Tokyo (JP)

(73) Assignee: Sony Corporation, Tokyo (JP)

( * ) Notice: Subject to any disclaimer, the term of this patent is extended or adjusted under 35 U.S.C. 154(b) by 643 days.

(21) Appl. No.: 11/194,658

(22) Filed: Aug. 2, 2005

(65) Prior Publication Data

US 2006/0028483 A1 Feb. 9, 2006

(30) Foreign Application Priority Data

Aug. 5, 2004 (JP) ............................... P2004-229927

(51) Int. Cl.
*G06T 15/00* (2011.01)
(52) U.S. Cl. ........................................................ 345/594
(58) Field of Classification Search .................... None
See application file for complete search history.

(56) References Cited

U.S. PATENT DOCUMENTS

| | | | | | |
|---|---|---|---|---|---|
| 5,222,206 | A * | 6/1993 | Liao | ............................. | 345/592 |
| 5,254,978 | A * | 10/1993 | Beretta | ........................ | 345/601 |
| 5,469,536 | A * | 11/1995 | Blank | ........................... | 345/594 |
| 5,615,320 | A * | 3/1997 | Lavendel | ..................... | 345/594 |
| 6,226,010 | B1 * | 5/2001 | Long | .............................. | 345/594 |
| 6,229,536 | B1 * | 5/2001 | Alexander et al. | ......... | 345/440.1 |
| 6,337,692 | B1 * | 1/2002 | Rai et al. | ....................... | 345/594 |
| 7,120,293 | B2 * | 10/2006 | Schoelkopf et al. | .......... | 382/162 |
| 7,180,524 | B1 * | 2/2007 | Axelrod | ........................ | 345/593 |
| 2003/0184557 | A1 * | 10/2003 | Wen | ............................... | 345/590 |
| 2004/0046802 | A1 * | 3/2004 | Wright et al. | ................. | 345/810 |
| 2005/0039142 | A1 * | 2/2005 | Jalon et al. | .................... | 715/823 |
| 2005/0280845 | A1 * | 12/2005 | Hussie | .......................... | 358/1.9 |
| 2006/0022994 | A1 * | 2/2006 | Hussie | .......................... | 345/591 |

FOREIGN PATENT DOCUMENTS

| | | |
|---|---|---|
| JP | 2000-101533 | 4/2000 |
| JP | A 2000-295487 | 10/2000 |
| JP | 2003-190134 | 7/2003 |
| JP | A 2004-007370 | 1/2004 |

OTHER PUBLICATIONS

Technique Bible Photoshop CS (Seeds Co., Ltd., SOFTBANK publishing Co., Ltd. Toshio Inaba, May 6, 2004, First edition, p. 60-61).

* cited by examiner

*Primary Examiner* — Ulka Chauhan
*Assistant Examiner* — Andrew G Yang
(74) *Attorney, Agent, or Firm* — Finnegan, Henderson, Farabow, Garrett & Dunner, L.L.P.

(57) ABSTRACT

An image display device having an image generation unit for generating an image according to an instruction, a display unit able to display in color the image generated at the image generation unit, a user interface unit including a color designation part enabling selective designation of any color from among a plurality of colors and an adjustment degree designation part able to instruct the degree of adjustment of at least attributes of the color designated by the color designation part, and a control unit for instructing the image generation unit so as to generate an image able to display at least a color designated by the color designation part of the user interface unit.

17 Claims, 10 Drawing Sheets

IMAGE DISPLAY DEVICE

CROSS REFERENCES TO RELATED APPLICATIONS

The present invention contains subject matter related to Japanese Patent Application No. 2004-229927 filed in the Japanese Patent Office on Aug. 5, 2004, the entire contents of which being incorporated herein by reference.

BACKGROUND OF THE INVENTION

1. Field of the Invention

The present invention relates to an image display device having for example a graphical user interface (GUI), more particularly relates to an image display device provided with functions of adjusting the color of an image.

2. Description of the Related Art

In an image display device, in order to display a more preferred quality of image, a user sometimes adjusts the image, that is, handles the image. Specifically, an image display device has several adjustment functions such as color conversion, gamma adjustment, and sharpness adjustment (refer to for example Japanese Unexamined Patent Publication (Kokai) No. 2000-101533). When adjusting an image display device, only the adjusted result is displayed. There is no function enabling discrimination of which pixels changed from an input image.

Some image processing devices designed for broadcasting stations control the image display devices from the outside or are connected to the input portions of the image display devices for image processing. Some of these enable discrimination of the adjusted pixels on external terminals.

In the adjustment of the image display device, only the adjusted result has been displayed. There has never been a function enabling discrimination of which pixels changed from the input image, and no image display device enabled discrimination of the adjusted pixels by itself.

The user of an image display device sometimes wants to visually compare the part of the picture which was image processed and the part of the picture not image processed. With the adjustment device at the outside of the image display device, it is necessary to instruct (input) the part of the picture to be image processed and the part of the picture not to be image processed using an external device. In that case, it is necessary to later adjust the instructions (input information) while looking at the displayed processing result of the image display device.

As explained above, the image display device has several adjustment functions such as color conversion, gamma adjustment, and sharpness adjustment. A user sometimes desires to learn the pixels changed by using the adjustment functions.

Further, in color adjustment up to now, white balance adjustment was mainly used for the adjustment. "White balance adjustment" is adjustment of the balance of the three primary colors of R, G, and B. Therefore, when adjusting the colors so as for example to make the sky bluer, make a lawn greener, or make skin color redder, if focusing on just those colors, adjustment to the preferred colors is possible. However, even colors which must not originally be changed are affected by the adjustment, so the overall color balance collapses. Further, since the adjusted colors and ranges cannot be identified, even if adjusting the colors while viewing the picture, it is difficult to visually determine which parts of the colors have changed and the range of their effect. In practice, skill becomes necessary in order to reproduce the preferred color. There are however limits to improvement of this skill.

SUMMARY OF THE INVENTION

It is therefore desirable to provide an image display device enabling a user of the image display device to differentiate between adjusted pixels and nonadjusted pixels by just the image display device without using any outside device, enabling easy selection of any adjusted color, adjustment of the adjustment range, and further adjustment of the saturation and hue within that range, and enabling improvement of usability (convenience) to the user.

To attain the above object, according to the present invention, there is provided an image display device having an image generation unit for generating an image according to an instruction, a display unit able to display in color the image generated at the image generation unit, a user interface unit including a color designation part enabling selective designation of any color from among a plurality of colors, and an adjustment degree designation part able to instruct the degree of adjustment of at least attributes of the color designated by the color designation part, and a control unit for instructing the image generation unit so as to generate an image able to display at least a color designated by the color designation part of the user interface.

Preferably, when the control unit receives an instruction of the attributes from the adjustment degree designation part of the user interface, the control unit instructs the image generation unit to generate an image able to display a color instructed by the color designation part with a degree of adjustment instructed by the adjustment degree designation part.

Preferably, the color designation part of the user interface unit can instruct the color for each color system, and the control unit instructs the image generation unit so as to generate an image including a palette able to be displayed over a predetermined range for each color system.

Preferably, the control unit instructs the image generation unit so as to display in color only the color system designated by the color designation part of the user interface on the palette.

Preferably, the user interface unit includes a color position instruction part enabling designation of a position serving as an axis of the color to be further displayed from the designated color system range, and the control unit instructs the image generation unit so as to display the color at the color position instructed by the color position instruction part in the color system instructed by the color designation part.

Preferably, the adjustment degree designation part of the user interface unit includes a range designation region enabling designation of the range of the color, a saturation designation region enabling designation of the degree of color saturation, and a hue designation region enabling designation of the degree of the hue.

Preferably, the control unit instructs the image generation unit so as to display in black and in white an image of the region other than the color designated by the color designation part.

Preferably, the control unit instructs the image generation unit so as to also display the colors other than the color designated by the color designation part when the adjustment degree designation part is selected.

Preferably, in the user interface unit, the adjustment degree designation part includes a range designation region enabling designation of the range of the color, a saturation designation region enabling designation of the degree of the color saturation, and a hue designation region enabling designation of the degree of the hue, and the control unit instructs the image generation unit so as to also display the colors other than the color designated by the color designation part when the saturation designation region or the hue designation region is selected from among three regions of the adjustment degree designation part.

According to the present invention, there is also provided an image display device having an image generation unit for generating an image according to an instruction, a display unit able to display in color the image generated at the image generation unit, a graphical user interface enabling designation of a display format concerning the color to be displayed on the display unit, and a control unit instructing the image generation unit so that it can display at least a color designated by a color designation part of the graphical user interface and so that it adds the graphical instruction region of the graphical user interface to generate the image, wherein the graphical user interface includes a color designation part enabling selective designation of any color system from among a plurality of color systems, a color position instruction part enabling designation of a position serving as the axis of the color to be further displayed from the designated color system range, a range designation part enabling designation of the range of the color, a saturation designation part enabling designation of the degree of the saturation, a hue designation part enabling designation of the degree of the hue, and a palette able to be displayed over a predetermined range for each color system.

Preferably, the control unit, when receiving instructions from the color position instruction part, range designation part, saturation designation part, and/or hue designation part of the graphical user interface, instructs the image generation unit so as to display the color instructed by the color designation part at the position and/or within the range of the designated color and with the designated color saturation and/or hue.

Preferably, the control unit instructs the image generation unit so as to display in color only the color system designated by the color designation part of the user interface on the palette.

According to the present invention, for example, the image displayed is made to freeze and in that state, color is left only in an area of the picture where adjustment is possible, colors which do not have to be adjusted are displayed in black and in white, and adjustable colors are simultaneously displayed on for example a color space palette. Namely, the adjustable range is easily discriminated and the adjustment color and/or adjustment range is easily selected or adjusted by referring to the actual picture or color space palette. After selecting or adjusting the adjustment color and/or adjustment range, the black and white display of for example areas not requiring adjustment is cancelled, and the adjustment of the color saturation and/or hue of only the areas designated ahead is carried out while viewing the overall color balance. At this time, the adjustment of the color saturation and/or hue has no effect at all other than at an adjustable area.

According to the present invention, by displaying non-adjustable colors by for example black and white, easy identification of the area (color) to be adjusted is possible. Further, the color space palette on the display screen is left with only the adjustable colors, therefore visually easy selection or adjustment of the adjustment area is possible.

Further, in adjustment of the color saturation and/or hue of the identified color, only the color to be adjusted is extracted, so adjustment is possible without influencing the other colors. When a user views various movies and other picture sources, there are picture sources with light colors and picture sources with dark colors. Especially, depending on the picture source, there are pictures having unnatural colors of the skin, sky, sea, grass, etc. The adjustment of only these specific colors is possible.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Figure 1:
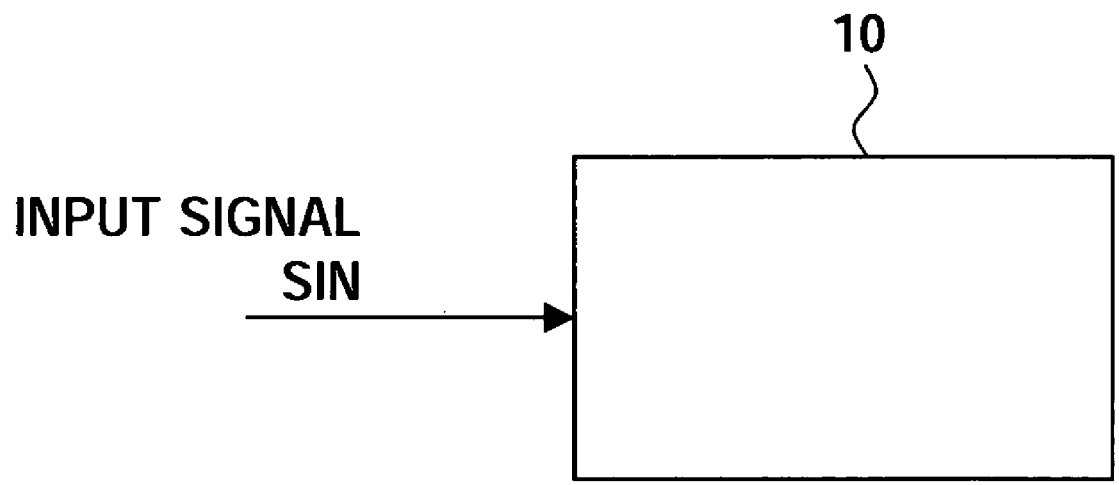
FIG. 1 is a diagram of the overall configuration of an image processing device according to an embodiment of the present invention.

Below, an explanation will be given of preferred embodiments of the present invention by referring to the drawings.

FIG. 1 is a diagram of the overall configuration of an image display device according to an embodiment of the present invention. In the present embodiment, an image display device 10 provided with color adjustment functions of the image becomes the entire view. The image display device uses a flat panel display in FIG. 1, but may include a CRT type, a projection type, etc. The image is sometimes adjusted at the main body and sometimes by a remote commander, but the remote commander is not shown.

The image display device 10 of the present embodiment has a GUI (graphical user interface) and is configured so as to enable easy selection of any adjustment color by referring to the image (picture) on a display screen or a color space palette on an OSD (graphical instruction region) of the GUI, then fine adjustment of the adjustment range and further adjustment of the color saturation and the hue within that range. By this configuration, it becomes possible to easily adjust only a specific color—not possible by image quality adjustment.

Figure 2:
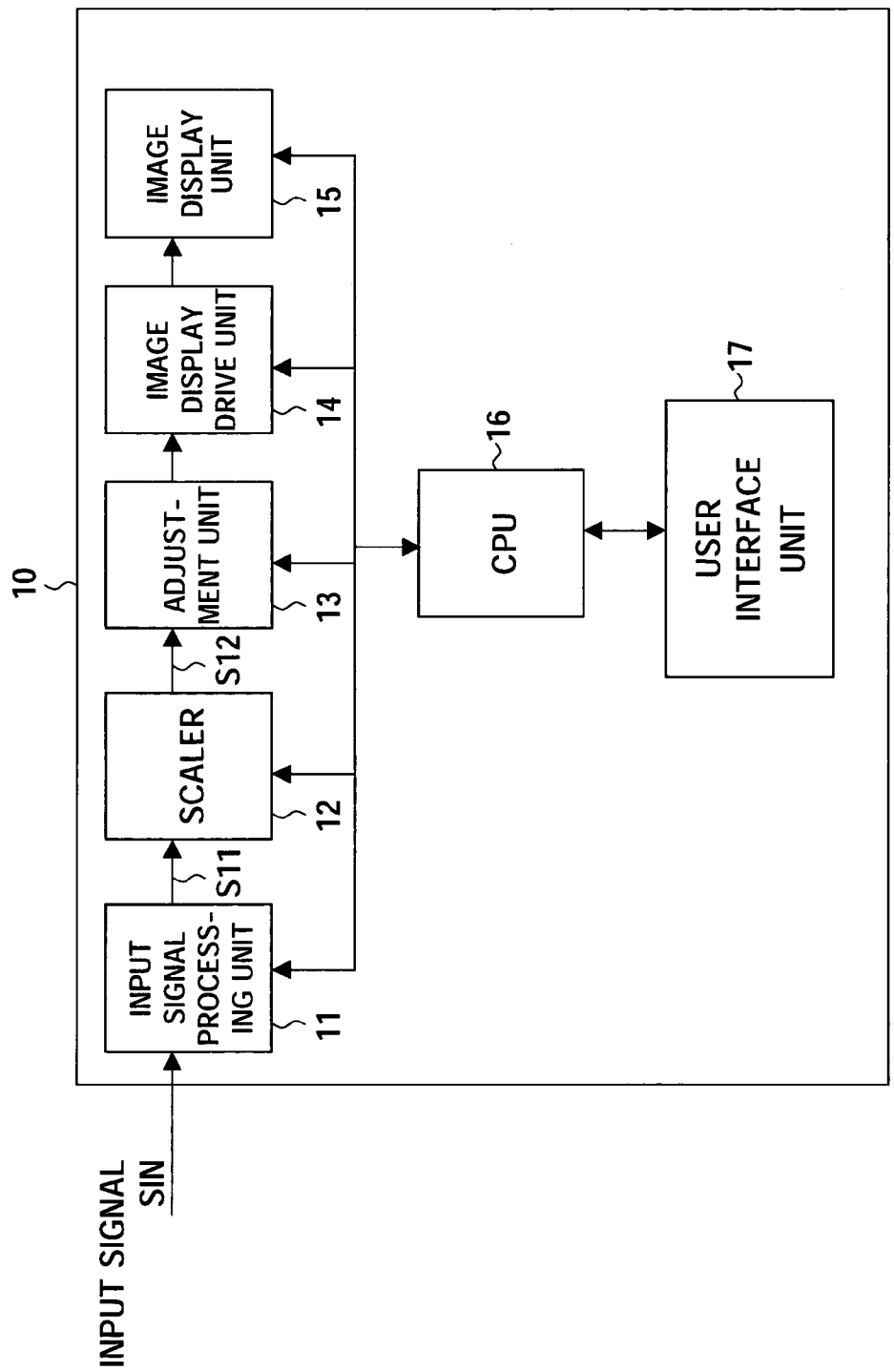
FIG. 2 is a block diagram of a picture display device including an image processing device according to an embodiment of the present invention.

FIG. 2 is a block diagram of the configuration of an image display device according to embodiment of the present invention.

The present image display device 10 has, as shown FIG. 2, an input signal processing unit 11, scaler 12, adjustment unit 13, image display drive unit 14, image (picture) display unit 15, control unit (CPU) 16, and user interface unit 17.

The input signal processing unit 11 converts a variety of input signals SIN to a signal format (for example RGB signals) suited to the scaler 12. The input signals SIN include a composite video signal, RGB signals, color difference signal, etc. based on the video signal reproduced by a DVD player etc.

The scaler 12 receives a signal S11 from the input signal processing unit 11, performs the image conversion, and outputs the same as a signal S12 to the adjustment unit 13.

The adjustment unit 13 performs adjustment (image processing) such as color conversion, gamma adjustment, and sharpness adjustment. The concrete configuration of this adjustment unit 13 will be explained in detail later.

The image display drive unit 14 prepares a signal required for the image display unit 15, extinguishes variation of light output of the image display unit 15, and adjusts the color temperature in order to drive the image display unit 15. The configuration of the image display drive unit 14 depends on the devices of the image display unit.

The control unit, that is, CPU 16, receives the instructions of the user transmitted through the user interface unit 17 and performs control according to a need with respect to the internal portion of the image display device 10.

The user interface unit 17 transmits the instructions of the user to the CPU 16.

In the image display device 10 of FIG. 2, the input signals SIN from the outside are input to the input signal processing unit 11.

The video signal is transmitted in a sequence of the input signal processing unit 11, the scaler 12, the adjustment unit 13, the image display unit drive unit 14, and the image display unit 15 and displayed on the image display unit 15.

Next, an explanation will be given of the concrete configuration of the adjustment unit 13 with reference to FIG. 3.

Figure 3:
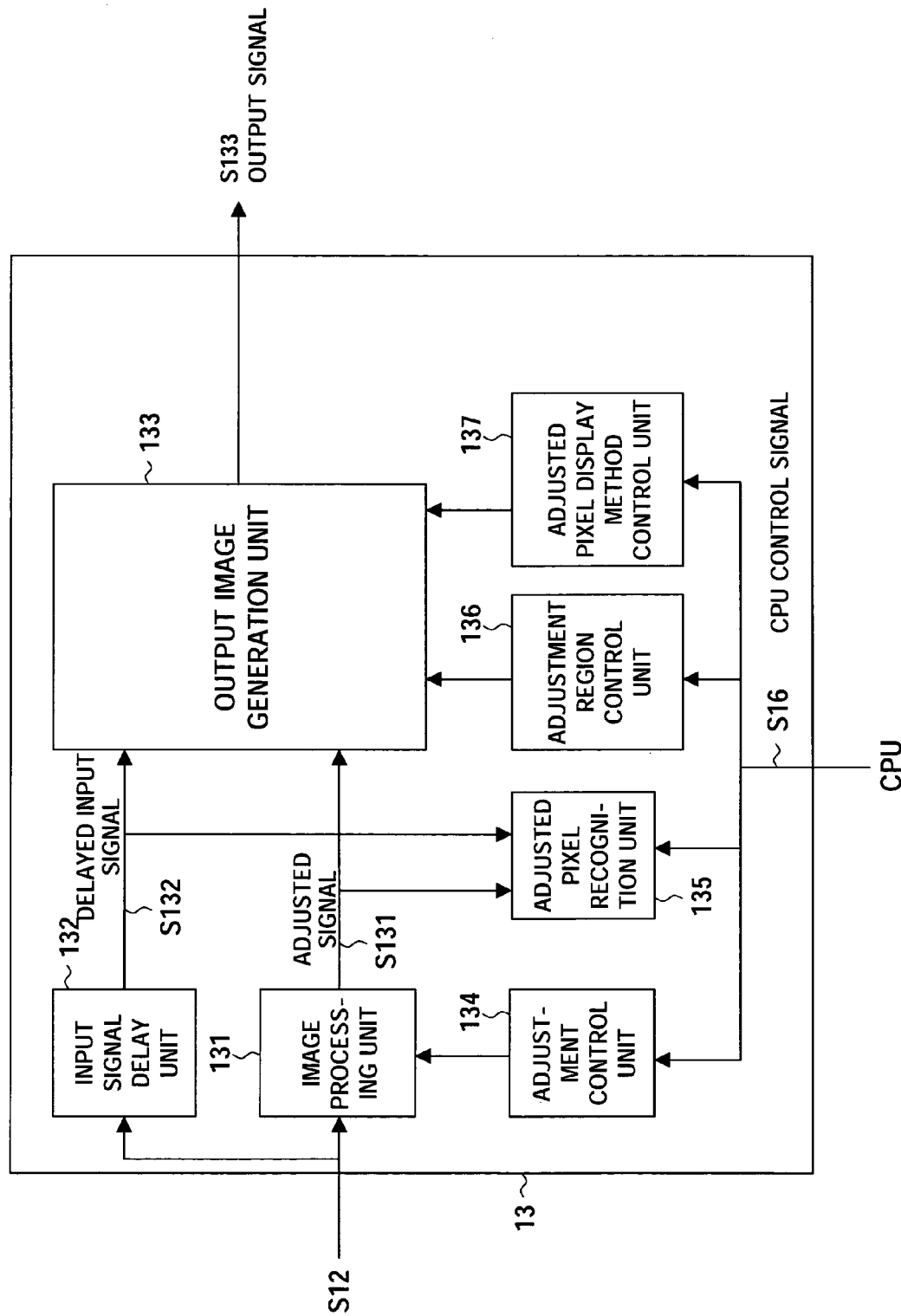
FIG. 3 is a block diagram of an example of the configuration of an adjustment unit according to an embodiment of the present embodiment.

FIG. 3 is a block diagram of an example of the configuration of the adjustment unit according to the present invention.

The adjustment unit 13 has, as shown in FIG. 3, an image processing unit 131, input signal delay unit 132, output image generation unit 133, adjustment control unit 134, adjusted pixel recognition unit 135, adjustment region control unit 136, and adjusted pixel display method control unit 137.

The output signal S12 of the scaler 12 becomes the input signal of the adjustment unit 13. The input signal S12 is input to the image processing unit 131 and the input signal delay unit 132.

The image processing unit 131 is a block for performing the image processing (adjustment). The image processing unit 131 performs adjustment such as the change of the color and outputs the result as an adjusted signal S131 to the output image generation unit 133 and the adjusted pixel recognition unit 135.

The input signal delay unit 132 is a block for giving the same delay as the time taken for the processing of the image processing unit 131 to the input signal S12 and holding the signal not to be image processed (adjusted). The input signal delay unit 132 outputs the delayed input signal as a delayed input signal S132 to the output image generation unit 133 and the adjusted pixel recognition unit 135.

The output image generation unit 133 generates a final output signal based on the adjusted signal S131 from the image processing unit 131 or the delayed input signal S132 from the input signal delay unit 132 under the control of the adjusted pixel recognition unit 135, the adjustment region control unit 136, and the adjusted pixel display method control unit 137 and transmits the same as the output signal S133 to the image display drive unit 14. The output image generation unit 133 generates the input delayed signal S132 or the adjusted signal S131 according to the instructions of the adjusted pixel recognition unit 135, the adjustment region control unit 136, and the adjusted pixel display method control unit 137 or adds the image processing to the same according to the instructions to generate the final output signal and sends the output signal S133 to the latter stages.

The adjustment control unit 134 controls the amount of the adjustment performed in the image processing unit 131 according to the instruction of the control signal S16 from the CPU 16. The adjustment control unit 134 raises the saturation or adjusts the hue in the adjustment of for example the designated color. The designation of the color is notified by the CPU 16 receiving the instruction of the user through the user interface unit 17 as will be explained later. In the present embodiment, the adjustment of the color is designated divided into for example six color systems, specifically the red color system, magenta color system, yellow color system, green color system, blue color system, and cobalt color system. Each color system is designated a predetermined range. Further, the position serving as the axis of the color to be displayed is further designated from the range of the designated and selected color system. Further, the saturation of the color to be adjusted and the adjustment degree of the hue are notified by the CPU 16 receiving the instruction of the user through the user interface unit 17 and adjusted according to the notified degree.

The adjusted pixel recognition unit 135 compares the values of the input delayed signal S132 and the adjusted signal S131 and judges whether or not each pixel was actually adjusted. The adjusted pixel recognition unit 135 transmits whether each pixel is an adjusted pixel or unadjusted pixel to the output image generation unit 133 by the judgment.

The adjustment region control unit 136 controls the processing for generation of the output image of the output image generation unit 133 so that the color notified by the CPU 16 receiving the instruction of the user through the user interface unit 17 can be displayed on the image display unit 15, then the graphical instruction region (OSD) of the GUI is added and the image is generated. Further, the adjustment region control unit 136 instructs the output image generation unit 123 to display in black and white the image in the regions other than the designated color under the control of the CPU 16. Further, the adjustment region control unit 136 instructs the output image generation unit 133 to also display in black and in white the colors other than the designated color under the control of the CPU 16.

The adjusted pixel display method control unit 137 instructs the method for differentiation of the adjusted pixels and the unadjusted pixels to the output image generation unit 133 according to the instruction of the control signal S16 from the CPU 16.

As explained above, the image display device 10 of the present embodiment has a GUI function as the user interface and is configured so as to be able to easily select any adjustment color and finely adjust the adjustment range by referring to the image (picture) on the display screen or the color space palette on the OSD of the GUI and further adjust the color saturation and hue within that range. By this configuration, it becomes possible to easily realize color adjustment of only a specific color—not possible with image quality adjustment. Below, an explanation will be given of a user interface unit 17 having a GUI function.

Figure 4:
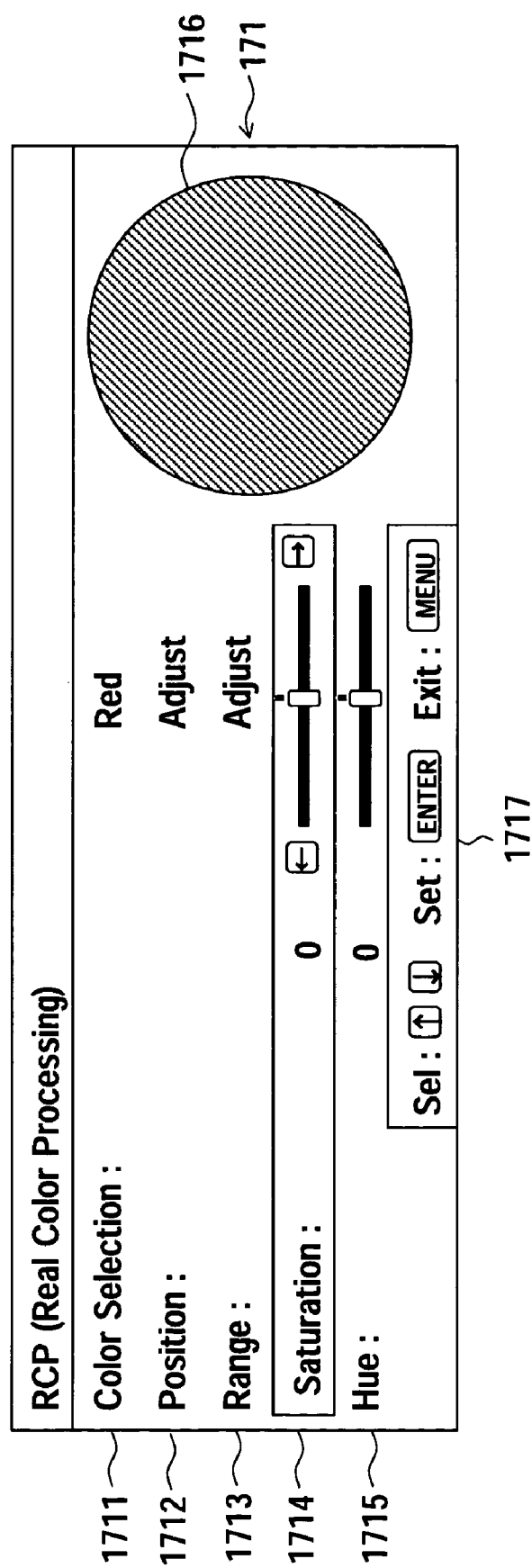
FIG. 4 is a diagram of an example of the configuration of an RCP (real color processing) display screen of a user interface according to an embodiment of the present embodiment.

The user interface unit 17 has a real color processing (RCP) display screen 171 included in the GUI function which enables designation of the display format for the color to be displayed on an image display unit 15 able to display in color an image (picture) generated at the output image generation unit 133 as shown FIG. 4. This RCP display screen 17 is displayed on the image display unit 15 overlapping for example part of the display image.

The RCP display screen 171 includes, as shown FIG. 4, a color designation part 1711 enabling selective designation of any color system from among a plurality of color systems (six systems in the present embodiment), a color position instruction part 1712 enabling further designation of the position serving as the axis of the color to be displayed from the designated color system range, a range designation part 1713 enabling designation of the range of the selected color system, a saturation designation part 1714 enabling designation of the degree of the color saturation of the selected color system, a hue designation part 1715 enabling designation of the degree of the hue of the selected color system, and a palette 1716 able to be displayed as a circle graph over a predetermined range for each color system. The RCP display screen 171 further has a selection input portion 1717 in which a cursor for selecting each designation part, keys for deciding the input, etc. are arranged. The selection, input decision processing, etc. of the designation parts with respect to the RCP display screen 171 are carried out by the user by using for example a not illustrated remote commander.

Figure 5:
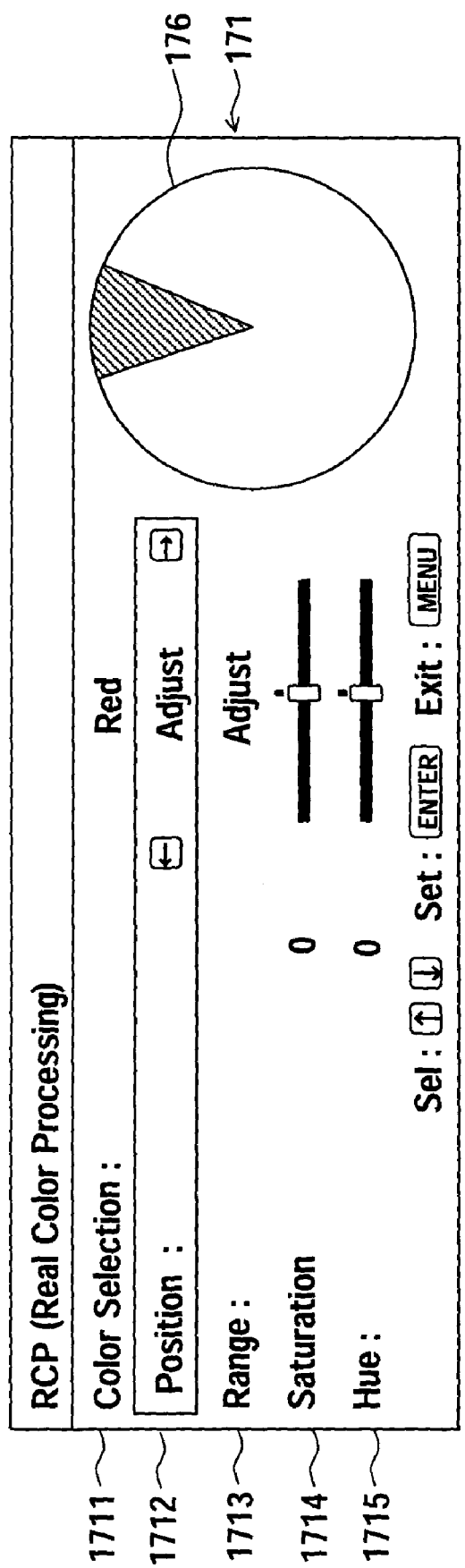
FIG. 5 is a diagram for explaining a display method of a selected color system in a palette of the RCP display screen of the user interface according to an embodiment of the present embodiment.

The palette 1716 is generated at the output image generation unit 123 under the control of the CPU 16 so that only the color system (hatching area of the palette 1716) designated by the color designation part 1711 is displayed in color as shown FIG. 5 when the color designation part 1711, the color position instruction part 1712, and the range designation part 1713 are selected. The palette 1716 is generated at the output image generation unit 123 under the control of the CPU 16 so that also the color systems other than the color system designated by the color designation part 1711 are displayed in color (all color systems are displayed) as shown FIG. 4 when the saturation designation part 1714 and the hue designation part 1715 are selected.

Figure 6:
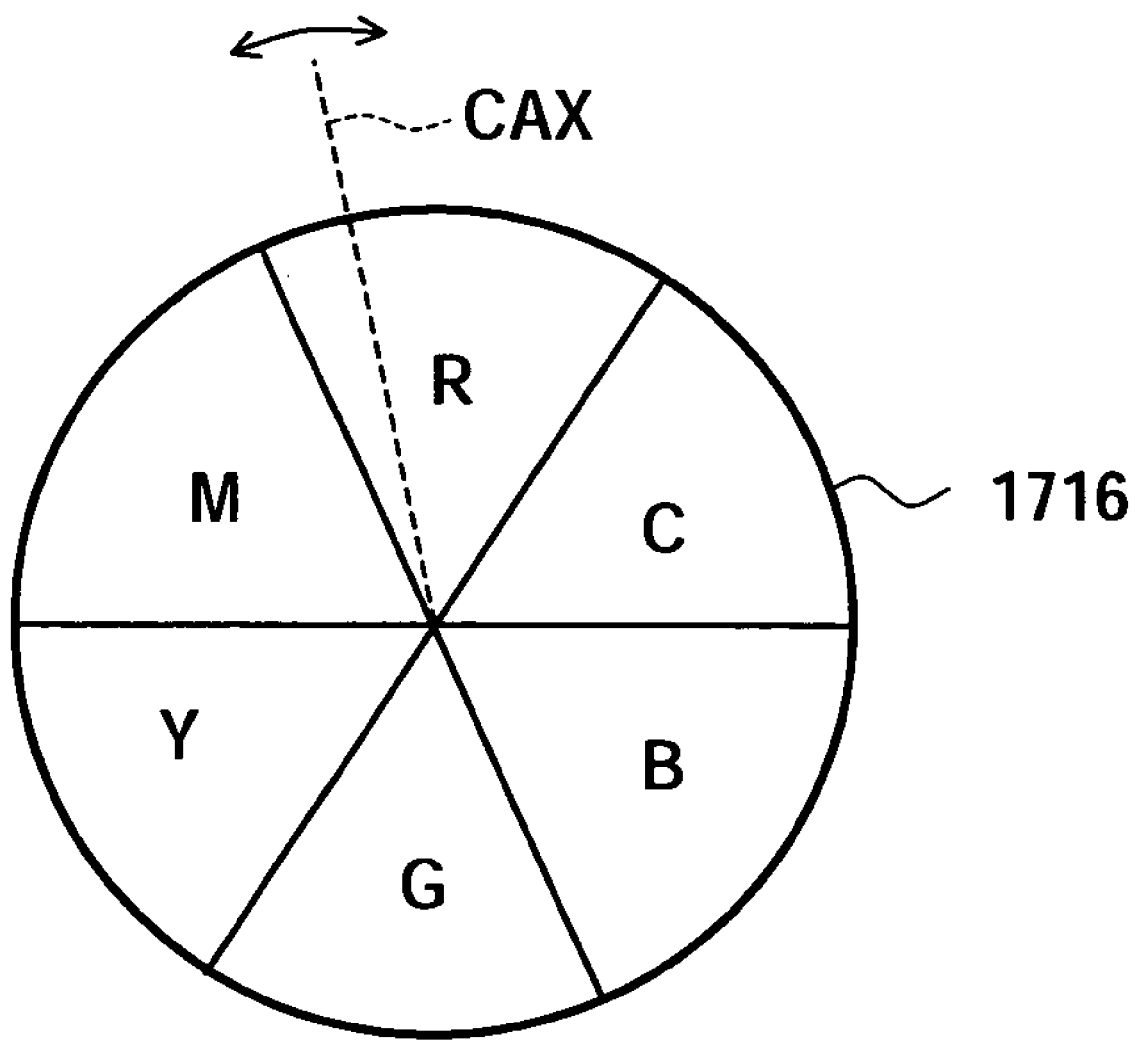
FIG. 6 is a diagram for explaining a display method of a color system in a palette of the RCP display screen of the user interface according to an embodiment of the present invention.
Figure 7:
FIG. 7 is a diagram of an example of an image displayed on the image display unit.
Figure 8:
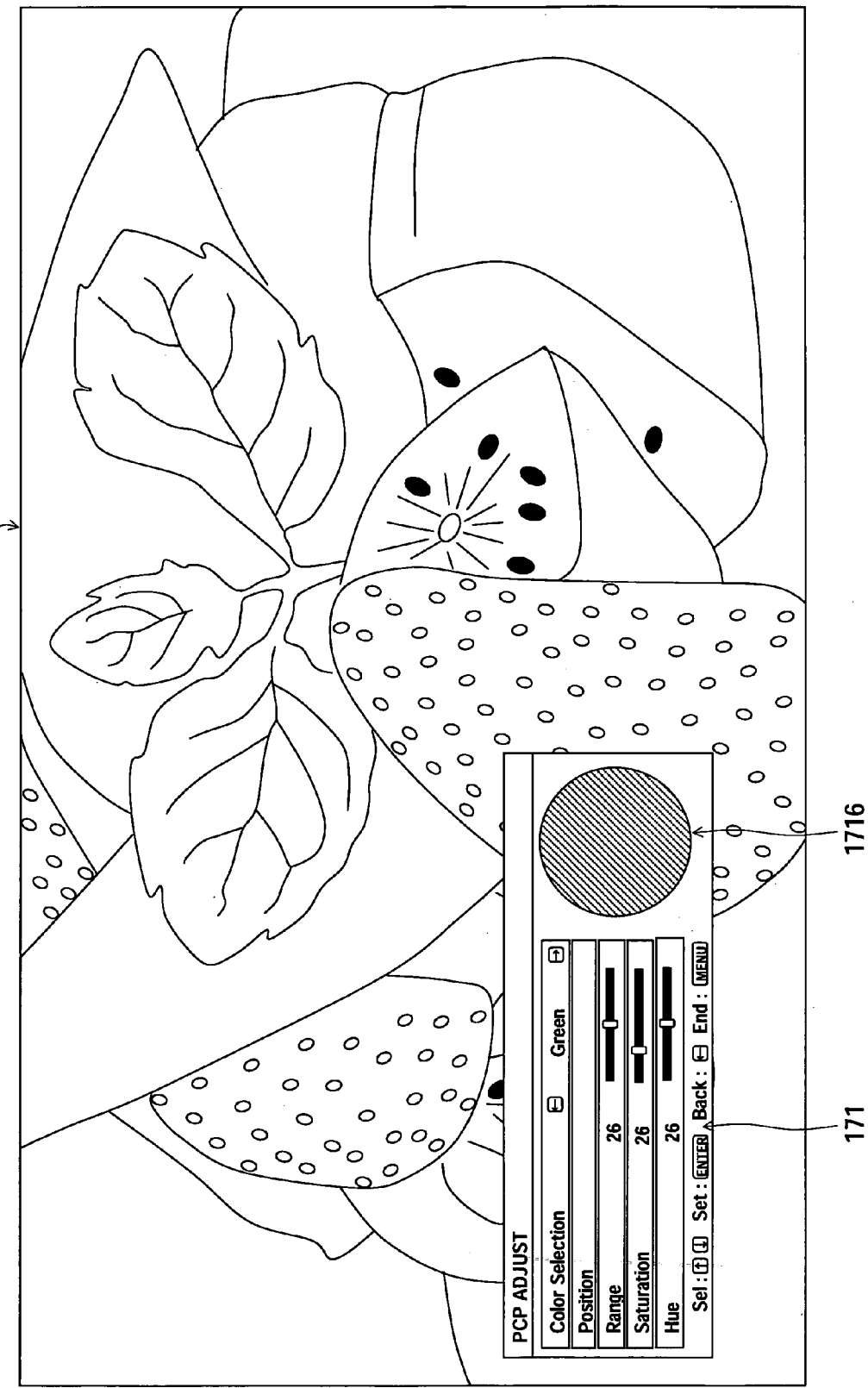
FIG. 8 is a diagram of an example of display of the display image of FIG. 7 on an RCP display screen.

In the present embodiment, as explained above, the palette 1716 is displayed divided into six color systems, specifically, as shown FIG. 6, a red color system (R), magenta color system (M), yellow color system (Y), green color system (G), blue color system (B), and cobalt color system (C). Basically, the palette 1716 displays the six color systems divided into ranges of 60 degrees each, but this can be freely changed. Further, when the position serving as the axis of the color to be displayed is further designated from the color system range by the color position instruction part 1712, the palette 1716 moves (rotates) about the color axis CAX in accordance with a designation operation as instructed by a broken line in for example FIG. 6.

The information concerning the color system, axis of the color, range, saturation, and hue designated by the user interface unit 17 having such the GUI function is supplied to the CPU 16. The CPU 16 can display the color designated by the color designation part 1711 and instructs the adjustment unit 13 including the output image generation unit 123 to add the RCP display screen 171 as the graphical instruction region so as to generate the image. When receiving the instructions of the color position instruction part 1712, the range designation part 1713, the saturation designation part 1714, and/or hue designation part 1715 of the RCP display screen 171, the CPU 16 instructs the adjustment unit 13 including the output image generation unit 133 to display the color instructed by the color designation part 1711 at the position and/or within the range of the designated color and with the designated saturation and/or hue. The CPU 16 instructs the adjustment unit 13 including the output image generation unit 133 to display in color an image showing only the color system designated by the color designation part 1711 and the palette 1716 when the color designation part 1711, the color position instruction part 1712, and the range designation part 1713 are selected. The CPU 16 generates the image at the output image generation unit 133 under the control of the CPU 16 to display an image showing the color systems other than the color system designated by the color designation part 1711 and the palette 1716 (all color systems displayed) when the saturation designation part 1714 and the hue designation part 1715 are selected.

Below, an explanation will be given of an example of the operation by taking as the example the user interface with reference to FIG. 7 to FIG. 10.

The image display unit 15 displays an image based on the input video (signal from the DVD player etc.) Then, for example as shown FIG. 7, the image for which adjustment is desired is frozen. When the adjustment mode is designated by a not illustrated remote commander, as shown FIG. 8, the RCP display screen 171 is displayed on the freeze screen.

Figure 9:
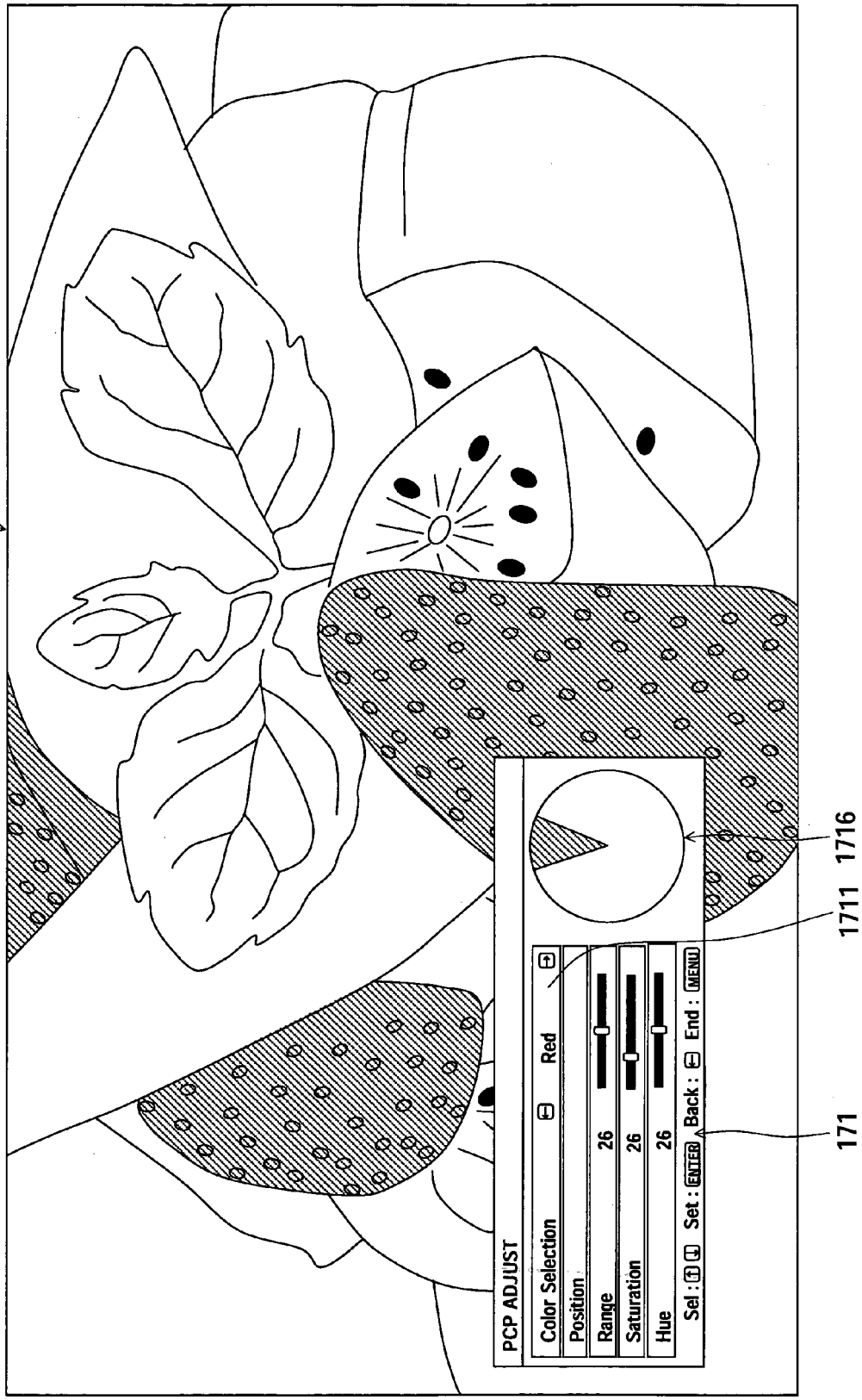
FIG. 9 is a diagram of an example of the displayed image when selecting a red system on the RCP display screen.
Figure 10:
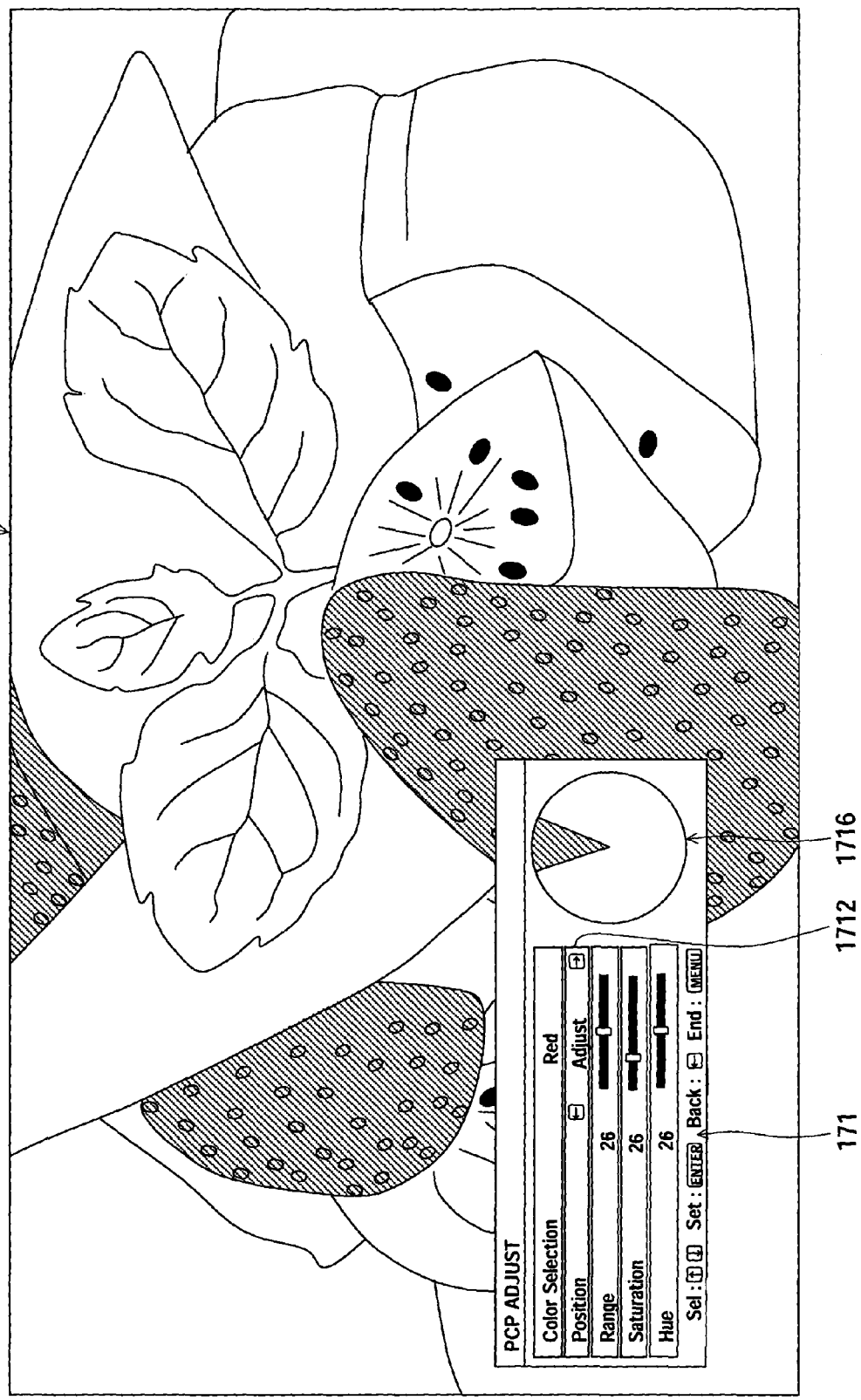
FIG. 10 is a diagram of an example of the displayed image when selecting a red system on the RCP display screen and selecting a color position designation part.

On this adjustment screen, first, as shown FIG. 9, the user uses a not illustrated remote commander to designate the color designation part 1711 of the RCP display screen 171 and select the color (system). In the example of FIG. 9, the red color system (Hatching area) is selected. When selecting the color, only the color for which adjustment is valid (red color system (Hatching area) in the example of FIG. 9) remains on the color space palette 1716 on the image and the ODS of the GUI. The rest are displayed in black and in white. The color to be adjusted is selected while viewing the image using that as a reference. After the selection of the adjustment color, fine adjustment of the adjustment area (color) is carried out by selecting the color position instruction part 1712 and further the range designation part 1713 as shown FIG. 10 while viewing the range where the color remains by the selected color.

After the end of the adjustment of the adjustment area, the saturation designation part 1714 and the hue designation part 1715 are selected within that range, and the color saturation and/or hue is adjusted so that a preferred color is obtained while viewing the overall color balance. After selecting/adjusting the adjustment color/adjustment range, the black and white display of the unadjustable areas and the adjustment of the saturation/hue in only the area designated ahead is possible while viewing the overall color balance. The adjustment of the saturation/hue has no effect at all other than on the adjustable area at this time.

Note that, in the present embodiment, there are six colors which can be adjusted. Independent adjustment for adjusting the adjustment range/saturation hue is possible for these six colors.

Next, an explanation will be given of the operation of circuits of FIG. 2 and FIG. 3.

For example, the user interface unit 17 transmits the instruction of the user as shown in FIG. 4 to the CPU (control unit) 16. The CPU 16 receives the instruction of the user transmitted through the user interface unit 17 and performs control according to need on the internal portion of the image display device 10. Then, the input signals SIN from the outside are input to the input signal processing unit 11. The video signal is transmitted in the sequence of the input signal processing unit 11, the scaler 12, the adjustment unit 13, the image display unit drive unit 14, and the image display unit 15 and displayed on the image display unit 15.

The adjustment unit 13 inputs for example the signal S12 from the scaler 12 to the image processing unit 131 and the input signal delay unit 132. Further, the adjustment control unit 134 controls the amount of the adjustment to be performed in the image processing unit 131 by an instruction by the control signal S16 from the CPU 16. The adjustment control unit 134 raises the color saturation or adjusts the hue for the adjustment of for example the designated color under the control of the CPU 16. The adjusted pixel recognition unit 135 compares the values of the input delayed signal S132 and the adjusted signal S131 and judges if each pixel was actually adjusted based on an instruction by the control signal S16 from the CPU 16.

The adjustment region control unit 136 performs processing for generating an output image at the output image generation unit 133 so that it can display the color notified by the CPU 16 receiving the instruction of the user through the user interface unit 17 on the image display unit 15 under the control of the CPU 16 and adds the OSD of the GUI to generate an image. The adjustment region control unit 136 instructs the output image generation unit 133 so as to display in black and in white the image of the regions other than the designated color under the control of the CPU 16. The adjustment region control unit 136 further instructs the output image generation unit 133 so as to also display colors other than the designated color under the control of the CPU 16 according to a user operation.

Then, the adjustment unit 13 adjusts for example the color at the image processing unit 131 and outputs the result as the adjusted signal S131 to the output image generation unit 133 and the adjusted pixel recognition unit 135. Further, the input signal delay unit 132 gives the same delay as the time taken for the processing of the image processing unit 131 to the input signal S12 and outputs the result as the delayed input signal S132 to the output image generation unit 133 and the adjusted pixel recognition unit 135. The adjusted pixel recognition unit 135 compares the values of the input delayed signal S132 and the adjusted signal S131 and judges if each pixel was actually adjusted. Then, according to the instructions of the adjusted pixel recognition unit 135, the adjustment region control unit 136, and the adjusted pixel display method control unit 137 and according to the input delayed signal S132 or the adjusted signal S131, the output image generation unit 133 processes the image, generates the final output signal, and outputs the output signal S133 to the image display drive unit 14. Under the control of the CPU 16, the image display device drive unit 14 performs processing such as the preparation of the signals required for the image display unit 15, absorption (extinguishment) of variations of light output of the image display unit 15, and adjustment of the color temperature and a desired picture is displayed on the image display unit 15.

As explained above, according to the present embodiment, since there is provided the RCP display screen 171 including the color designation part 1711 enabling selective designation of any color system from among a plurality of color systems (six systems in the present embodiment), the color position instruction part 1712 enabling further designation of the position serving as the axis of the color to be displayed from the designated color system range, the range designation part 1713 enabling designation of the range of the selected color system, the saturation designation part 1714 enabling designation of the degree of saturation of the selected color system, the hue designation part 1715 enabling designation of the degree of the hue of the selected color system, and the palette 1716 able to be displayed as a circle graph over a predetermined range for each color system, the following effects can be obtained.

It is possible to freeze the displayed picture and, in that state, leave the color at only the area which can be adjusted in the picture, display colors not needing adjustment in black and in white, and simultaneously display colors which can be adjusted on the color space palette on the OSD of the GUI. As a result, a user can refer to the actual picture or color space palette and easily discriminate the adjustable range and can easily select/adjust the adjustment color/adjustment range. After selecting/adjusting the adjustment color/adjustment range, the black and white display of the unadjustable areas is cancelled, so it is possible to view the overall color balance to adjust the color saturation/hue in only the areas designated ahead. At this time, the adjustment of the color saturation and/or hue has no effect at all other than at an adjustable area. It is also possible to independently adjust the adjustment range and/or color saturation and hue for a plurality of adjustable colors.

More specifically, in the adjustment of color, it is very hard to determine the range of effect of adjustment of color. By leaving the color in just the actual adjustable areas and displaying non-adjustable colors in black and white, it is easy to identify the area (color) to be adjusted. Further, the color space palette on the OSD of the GUI is also left with only the adjustable colors, therefore selection/adjustment of the adjustment area can be visually easily carried out.

With the conventional method using adjustment of the color saturation, hue, color temperature, or white balance, it was not possible to extract and adjust only a specific color in order to reproduce the desired color, therefore the overall color balance collapsed after the adjustment, but in the present embodiment, it is possible to adjust the color saturation and/or hue for a specific color, so it is possible to extract and adjust only the color to be adjusted without affecting the other colors.

When a user views various movies and other picture sources, there are picture sources with light colors and picture sources with dark colors. Especially, depending on the picture source, there are pictures having unnatural colors of the skin, sky, sea, grass, etc. The adjustment of only these specific colors is possible.

It should be understood by those skilled in the art that various modifications, combinations, sub-combinations, and alterations may occur depending on design requirements and other factors insofar as they are within the scope of the appended claims or the equivalents thereof.

What we claim is:
1. An image display device comprising:
an image generation unit for generating a display image,
a display unit for displaying in color the display image,
a user interface unit including a color designation part for selecting a color system from among a plurality of color systems, an adjustment degree designation part for adjusting attributes of the color system selected by the color designation part, and a palette comprising the plurality of color systems, and
a control unit for instructing the image generation unit to generate the display image having in color only the selected color system,
wherein the palette comprises a color wheel having a continuous range of a plurality of colors and including at least a red color system, a green color system, and a blue color system, wherein the color system comprises a continuous range of a plurality of colors, the plurality of color systems are predetermined independent of the display image, and, after the color designation part selects the color system, the color wheel has only the selected color system displayed in color, and wherein the user interface unit includes a color position instruction part for selecting a position serving as an axis on the color wheel of the color to be displayed from the selected color system range, and a range designation region for adjusting the continuous range of the plurality of colors on the color wheel.

2. An image display device as set forth in claim 1, wherein the control unit receives the attributes of the selected color system from the adjustment degree designation part, and, in response to receiving the attributes, the control unit instructs the image generation unit to apply the attributes to the display image.

3. An image display device as set forth in claim 2, wherein the control unit instructs the image generation unit to display in black and white the region of the display image other than the selected color system.

4. An image display device as set forth in claim 2, wherein the control unit instructs the image generation unit to also display the display image in the colors other than the selected color system when the adjustment degree designation part is selected.

5. An image display device as set forth in claim 1, wherein the control unit instructs the image generation unit to display the display image having in color only the selected color system.

6. An image display device as set forth in claim 5, wherein the control unit instructs the image generation unit to display the color at the color position in the selected color system.

7. An image display device as set forth in claim 6, wherein the adjustment degree designation part includes:
a range designation region for selecting the range of the plurality of colors,
a saturation designation region for selecting the degree of color saturation, and
a hue designation region for selecting the degree of the hue.

8. An image display device as set forth in claim 1, wherein the adjustment degree designation part includes:
a saturation designation region for selecting the degree of color saturation, and
a hue designation region for selecting the degree of the hue.

9. An image display device as set forth in claim 1, wherein the control unit instructs the image generation unit to display in black and white the region of the display image other than the selected color system.

10. An image display device as set forth in claim 9, wherein the control unit instructs the image generation unit to also display the display image in the colors other than the selected color system when the adjustment degree designation part is selected.

11. An image display device as set forth in claim 1, wherein the control unit instructs the image generation unit to also display the display image in the colors other than the selected color system when the adjustment degree designation part is selected.

12. An image display device as set forth in claim 11, wherein the adjustment degree designation part includes
a saturation designation region for selecting the degree of the color saturation, and
a hue designation region for selecting the degree of the hue, and
the control unit instructs the image generation unit to also display the display image in the colors other than the selected color system when the saturation designation region or the hue designation region is selected.

13. An image display device comprising:
an image generation unit for generating a display image,
a display unit for displaying in color the display image,
a graphical user interface for selecting a display format concerning the color to be displayed on the display unit, and
a control unit for instructing the image generation unit to display the display image having in color only a color system selected by a color designation part of the graphical user interface and to display a display screen of the graphical user interface,
wherein the graphical user interface includes
a palette comprising a plurality of color systems, wherein the palette comprises a color wheel having a continuous range of a plurality of colors and including at least a red color system, a green color system, and a blue color system,
a color designation part for selecting the color system from among the plurality of color systems,
a range designation part for selecting a continuous range of the color of the selected color system on the color wheel,
a color position instruction part for selecting a position serving as the axis on the color wheel of the color to be displayed from the selected color system range,
a saturation designation part for selecting the degree of the color saturation, and
a hue designation part for selecting the degree of the hue,
wherein the color system comprises a continuous range of a plurality of colors, the plurality of color systems are predetermined independent of the display image, and, after the color designation part selects the color system, the color wheel has only the selected color system displayed in color.

14. An image display device as set forth in claim 13, wherein when the control unit receives instructions from the color position instruction part, range designation part, saturation designation part, and/or hue designation part, the control unit instructs the image generation unit to display the display image having in color the color system instructed by the color designation part at the position and/or within the range of the selected color system and with the selected saturation and/or hue.

15. An image display device as set forth in claim 13, wherein the control unit instructs the image generation unit to display the display image having in color only the selected color system.

16. An image display device as set forth in claim 13, wherein the control unit instructs the image generation unit to display in black and white the region of the display image other than the selected color system.

17. An image display device as set forth in claim 13, wherein the control unit instructs the image generation unit to also display the display image in the colors other than the selected color system when the adjustment degree designation part is selected.

* * * * *